Aug. 3, 1926.  
F. A. BALLOU, JR  
1,595,054  
MEANS FOR ATTACHING AN ELEMENT TO A POST  
Filed May 11, 1925
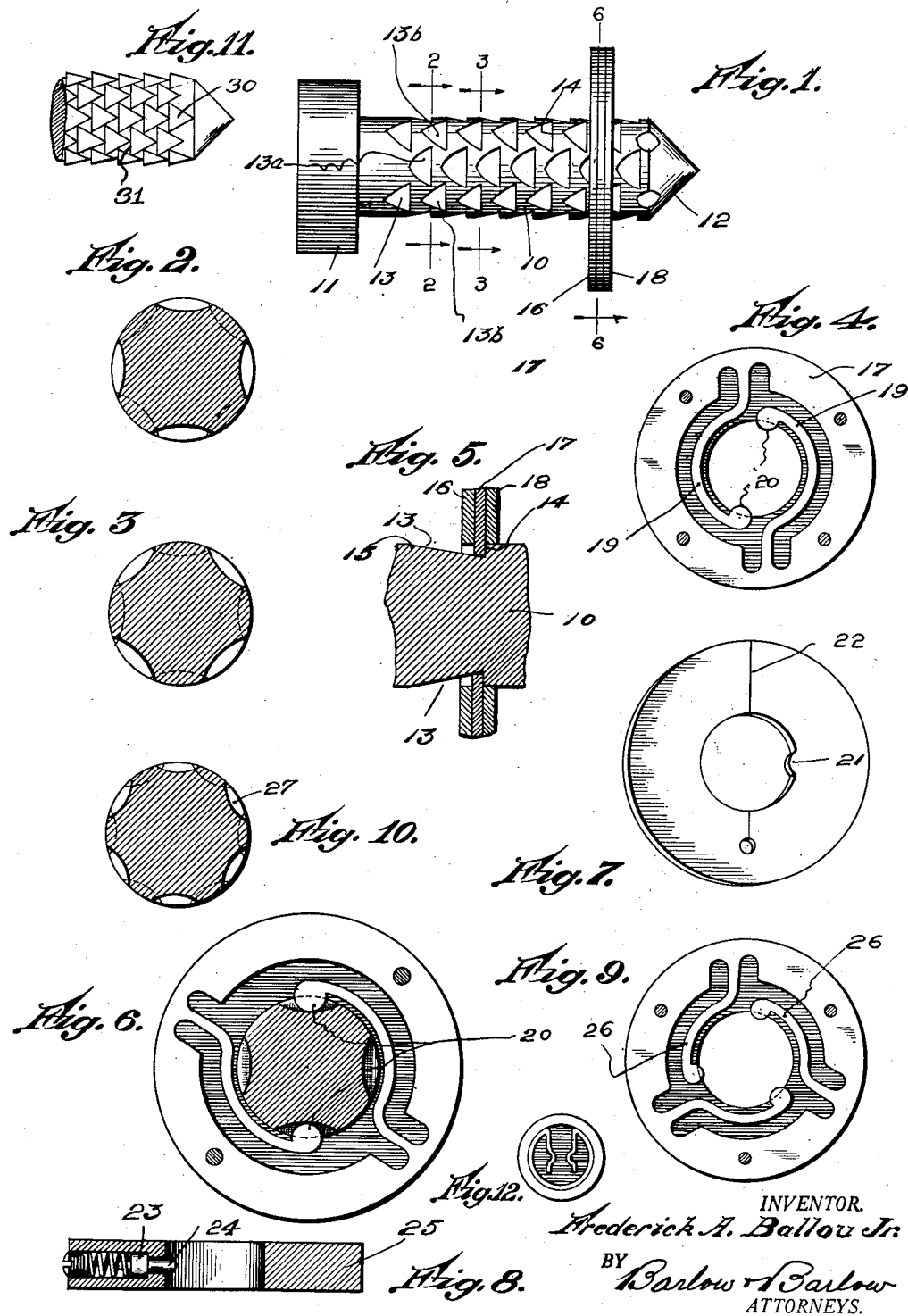
INVENTOR.  
Frederick A. Ballou Jr.  
BY  
Barlow & Barlow  
ATTORNEYS.

Patented Aug. 3, 1926.

1,595,054

UNITED STATES PATENT OFFICE.

FREDERICK A. BALLOU, JR., OF PROVIDENCE, RHODE ISLAND, ASSIGNOR TO B. A. BALLOU & CO., INC., OF PROVIDENCE, RHODE ISLAND, A CORPORATION OF RHODE ISLAND.

MEANS FOR ATTACHING AN ELEMENT TO A POST.

Application filed May 11, 1925. Serial No. 29,634.

This invention relates to an improved means for readily removably attaching stud and socket or male and female members, or the like; and has for its object to provide means whereby the members may be quickly attached and detached and yet one by which the same may be securely locked together.

A further object of this invention is to provide one of the surfaces of the interengaging stud and socket members with abutments and means in the other of said members for engaging said abutments.

A still further object of this invention is to provide the surface of the stud with a series of abutments distributed about its surface, and the socket member with means for engaging the different abutments on the stud to prevent its accidental removal therefrom.

A still further object of the invention is to provide co-operating means between the stud and socket members to permit the same to be slid axially together and yet be prevented from being withdrawn by a similar axial movement in the opposite direction irrespective of the relative rotative positions of the members, the members being removable only by a rotating or oscillating movement combined with a relative endways movement.

With these and other objects in view, the invention consists of certain novel features of construction, as will be more fully described, and particularly pointed out in the appended claims.

In the accompanying drawings:

Figure 1 is a side elevation illustrating one form of device constructed to accomplish the objects of this invention.

Figure 2 is a section on line 2—2 of Figure 1, illustrating one arrangement of the notches formed in the surface of the stud member.

Figure 3 is a view similar to Figure 2 through a different series of notches.

Figure 4 is a plan view of the socket member with one of its plates removed illustrating a pair of spring arms which are adapted to snap into engagement with the various notches in the stud member of the device.

Figure 5 is a sectional side elevation illustrating the arms of the socket member as engaging the notches in the stud member.

Figure 6 is a sectional view on line 6—6 of Figure 1 showing the arms of the socket member as engaging the notches of the stud member, these arms being formed shorter than those illustrated in Figure 4.

Figure 7 is a modified and simplified form of socket member or fastening element showing the same as being of a resilient plate having a single abutment engaging portion.

Figure 8 is another form of socket member or fastening element in which a spring-pressed pin is employed for engaging the notches of the stud member.

Figure 9 is a face view of another modification of the socket member or fastening element having three engaging arms arranged in thirds about the stud member receiving opening.

Figure 10 is a transverse sectional view of the stud member having notches arranged to cooperate with and receive the arms arranged in thirds about the stud member opening.

Figure 11 is a side levation showing a modified construction of the formation of abutments on the stud member.

Figure 12 shows still another form of socket member in which the engaging arms are formed of spring wire.

It is found in the practical construction and operation of a so-called threaded shank and nut construction of fastening means, in many instances, that the screwing of a threaded nut onto a threaded shank requires considerable loss of time and becomes easily detached from the moving parts with which it may be in working engagement; also in many instances to avoid this relatively slow screwing action a so-called clutch is employed for gripping the smooth shank of the article to be secured, but such clutches can only be employed where there is an extended length of shank and also such clutches are expensive in construction. To obviate the necessity of positioning the nut or retaining element by a screw action and also to obviate the expensive clutch construction together with its extended length, I have formed a socket member or fastening element which has the combined advantages of the security of the nut and the quick action of the clutch without the disadvantages of either. To accomplish these results in a simple and effective way, I have formed or arranged a set of abutments about the surface of the stud member of the device, which may be engaged by resilient means carried by the socket member and this means may be formed very thin if desired so as to take up the minimum amount of space and it may also be arranged to carry one or more engaging portions which are adapted to snap into engagement with the abutments on the stud member of the device and these members are adapted to be positioned in interengagement by a straight rectilinear or axial movement and at the same time are prevented from a withdrawing movement except by a combined relative rotating and axial motion.

Further, by my improved construction the engaging portions in the socket member when snapped into engagement with the different shoulders or abutments are yieldingly retained from movement in any direction thus locking the members together, the same being adapted to be quickly positioned without a rotating action and as quickly withdrawn by a combined rotating and axial action; and the following is a detailed description of the present embodiment of my invention showing one construction by which these advantageous results may be accomplished:—

With reference to the drawings, 10 designates the stud or male member of the device, which is provided with a head 11 at one end and which is preferably pointed slightly at its opposite end 12 to more readily enter the receiving opening in the female or socket member.

The surface of this stud is provided with a series of abutments 14 which are herein shown as being formed by notches or recesses 13 formed in the surface of the post, those herein shown being arranged in axially disposed series, the series of notches in one row being arranged in staggered relation with the notches in the next adjacent rows on either side thereof and parallel rows or series are alternately arranged about the circumferential surface of the stud to overlap each other laterally, that is the outer edges of the series of notches 13ª overlap the outer adjacent edges of the notches of the adjacent series 13ᵇ.

These notches are preferably shaped each with a square shoulder or abutting wall 14 which is preferably at right angles to the axis of the post and on the side of the notch closest its pointed end 12 or opposite its head end 11. The bottom of the notches are concaved and arranged at an acute angle to the abutment 14 and inclined outwardly or toward the surface of the post and in the direction of the head 11. The inclined wall provides a means causing the resilient means of the socket member to slide down toward the abutment and to cause a step-by-step separating movement of the members when rotated, while the concavity of the wall provides inclined side walls of the notches or a means for preventing a relative rotation of the members and a means for flexing the resilient means of the socket member to permit a relative axial movement of the member.

In order to provide a female or socket member which is provided with means for yieldably engaging these notches and which may be quickly positioned on the stud member and readily withdrawn therefrom, I have shown one form in Figures 1 and 5 as being constructed of three plates 16, 17 and 18 having an opening to permit the passage of the stud member therethrough, the intermediate plate 17 being shaped to provide resilient means in the form of a pair of spring arms 19, each having an end portion 20 extending into the central opening for the purpose of yieldingly engaging any of the presented recesses 13 formed in the stud member as the socket member of the device is applied thereto, by which construction it will be seen that this socket member may be forced axially onto the stud, the inclination of the recesses in the shank permitting these arms 19 to snap into the various recesses in being positioned thereon, the square walls or shoulders 14 of these recesses effectually preventing a movement of the nut in the opposite or detaching direction and the side walls of the notches serving as a means to cause the resilient means to move out of the notches by a relative rotation of the members. Therefore it will be seen that in order to remove this socket member from its position on the stud, it is necessary to impart a relatively slight rotation to carry these arms laterally out of engagement with their notches and as the notches of the next adjacent row are staggered and arranged axially in a different plane, a movement of the arms from a notch in one row to a notch in the next row naturally necessitates or causes a relative endways movement of the member as these different rows are staggered or out of alignment with each other; also as the notches have an inclined wall 15 against which the inherent spring in the arms press radially, they are caused to slide down this incline into engagement with the abutment of the notches in the next adjacent row, and likewise a continued rotative movement will cause the arms to move step by step into the different adjacent rows thereby permitting and causing an axial advancing movement in combination with a relative rotating motion imparted thereto, It will be seen from the above arrangement of these different rows of notches that are engaged by the spring arms of the socket member, that a relative rotating or oscillating motion of the members will be necessary in order to separate the same and yet the members may be interlocked by an axial interengaging movement irrespective of their relative rotative positions about their axis.

It will also be seen by my improved construction which is well illustrated in Figure 6, that the pressure of the ends 20 of these arms serves to grip and causes them to snap into the concave recesses of the stud and thereby serve as a detent and offer frictional resistance to the rotation of this socket member so as to prevent the same from being moved from any adjusted position.

Figure 7 shows a modification of a single plate which is provided with an engaging protuberance 21 adapted to enter the notches of the stud. This plate is split as at 22 to permit sufficient yieldability to cause the protuberance to snap into the various notches formed in the stud when positioned thereon.

Another construction is illustrated in Figure 8 in which a spring-pressed pin 23 has its end portion 24 projecting into position to engage the different notches of the stud when the socket member 25 is positioned thereon. Another modification as illustrated in Figure 9 is similar to that illustrated in Figure 4 but which instead of having two diametrically oppositely disposed arms, is shown as being provided with three arms 26 located at substantially 120° apart, in the proper operation of which construction it will be necessary to similarly arrange the notches 27 as shown in Figure 10, in groups, the notches in each group being 120° apart.

I have herein shown a number of different designs of socket or female members but I do not wish to be limited to any of the particular arrangements of the arms or engaging members in these different elements as any suitable arrangement of such engaging or gripping members in this socket member which may be snapped into engagement with the different abutments on the stud member, will fall within the spirit and scope of this invention, neither do I wish to be limited to the notches as projections may be formed on the stud, as illustrated at 30, in Figure 11, which projections form abutments 31 cooperating with and acting similarly to these abutments 14, above described.

I have used in the claims the term "a device of the character described" and by this term I mean any male member such as a post, pin, stud, shank, tube or the like in combination with any female member having an opening or recess to receive the same, such as a nut, washer, socket member, or other fastening element, each of these being provided with cooperating means between them to removably attach the two together; and by the term "socket" I mean any member having an opening through it or a recess in it to receive a stud or the like.

My improved fastening device may be employed for widely varying uses such as for instance, in the jewelry line, as the provision of a readily removable securing nut on the shank of a lapel button, in a cuff button and numerous kindred articles, or in a widely different field it may be employed to provide a quick detachable nut or fastening member for securing artillery wheels to an axle. Its use is not restricted to any particular class of trade or articles. One of its advantages is that the nut or socket may be formed extremely thin to take up the minimum amount of space and still preserve its retaining features of quick detachability and secure holding. Then again, this nut is retained in position by a spring detent from becoming inadvertently released or disengaged from its post or shank. This device also possesses the greatly desired features of being quickly attached, securely held and readily detached without a complete screwing action upon the parts.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A device of the character described comprising interengaging stud and socket members, means carried by one of said members, and means carried by the other of said members to be engaged by the first said means irrespective of the relative rotative positions of said members, said means cooperating to permit said members to be attached by an axial movement in one direction and moved in the opposite axial direction only by a relative rotative movement in either direction.

2. A device of the character described comprising interengaging stud and socket members, resilient means carried by one of said members, and means carried by the other of said members to be engaged by said resilient means irrespective of the relative rotative position of said members, said means cooperating to permit said members to be attached by an axial movement and caused to be separated by a relative rotative movement in either direction.

3. A device of the character described comprising interengaging stud and socket members, resilient means carried by one of said members, abutment means carried by the other of said members to be engaged by said resilient means irrespective of the relative rotative position of said members and prevent relative axial movement in one direction, and means for causing said resilient means to flex by a relative rotative movement of said members to permit a relative axial movement thereof in the said direction.

4. A device of the character described comprising interengaging stud and socket members, resilient means carried by one of said members, spaced staggered abutment means carried by the other of said members to be engaged by said resilient means and prevent relative axial movement in one direction, and means for causing said resilient means to flex by a relative rotative movement of said members to permit a relative axial movement thereof in the said direction.

5. A device of the character described comprising interengaging stud and socket members, resilient means carried by one of said members, spaced staggered abutment means carried by the other of said members and located to be engaged by said resilient means upon interengagement of said members irrespective of their relative rotative positions about their axes.

6. A device of the character described comprising interengaging stud and socket members, resilient means carried by one of said members, abutment means carried by the other of said members to be engaged by said resilient means, and means cooperating with said resilient means for causing a separating movement of said members by a relative rotative movement thereof in either direction.

7. A device of the character described comprising interengaging stud and socket members, resilient means carried by one of said members, spaced staggered abutment means carried by the other of said members to be engaged by said resilient means, and means cooperating with said resilient means for causing a separating movement of said members by a relative rotative movement thereof.

8. A device of the character described comprising interengaging stud and socket members, resilient means carried by one of said members, abutment means carried by the other of said members to be engaged by said resilient means, and means cooperating with said resilient means for causing a step-by-step separating movement of said members upon a relative rotative movement thereof.

9. A device of the character described comprising interengaging stud and socket members, resilient means carried by one of said members, abutment means carried by the other of said members to be engaged by said resilient means, and means cooperating with said resilient means for causing a step-by-step relative axial movement of the members upon a relative rotative movement thereof in either direction.

10. A device of the character described comprising interengaging stud and socket members, the surface of one of said members being provided with a plurality of spaced abutments arranged in staggered overlapping relation, and means carried by the other of said members for engaging said abutments to releasably lock said members together.

11. A device of the character described comprising interengaging stud and socket members, a plurality of parallel rows of abutments carried by one of said members, the abutments of one row being staggered relatively to and overlapping the abutments of the next row, and means carried by the other of said members for engaging said abutments to prevent disengagement of said members in one direction.

12. A device of the character described comprising a stud circular in cross section and having a plurality of notches therein arranged in staggered overlapping relation, a socket member having an opening to receive said stud, resilient means carried by said socket member for engaging said notches to lock said member on said stud.

13. A device of the character described comprising interengaging stud and socket members, resilient means carried by one of said members, abutment means carried by the other of said members to be engaged by said resilient means irrespective of the relative rotative position of said means about their axes, and means adjacent said abutments for engaging said resilient means to prevent a relative rotating movement of said members when said resilient means are in engagement with said abutment means.

14. A device of the character described comprising interengaging stud and socket members, notches in the surface of one of said members arranged in staggered relation and each having an abutment wall, resilient means in the other of said members for engaging said notches, said notches having a bottom wall inclined towards said abutment to cause said resilient means to move towards said abutment.

15. A device of the character described, comprising a stud having acute angularly-shaped notches therein with one wall substantially at right angles to its axis and arranged in spaced staggered relation, a member having an opening adapted to receive said stud, resilient means carried by said member for entering said notches to prevent said member from being moved in one direction but yielding and permitting said member to be moved axially in the opposite direction.

16. A device of the character described, comprising a stud member having acute angularly-shaped notches therein with one wall substantially at right angles to its axis, the notches being arranged in rows those in one row being staggered with relation to those in the next row, a socket member having an opening adapted to receive said stud member, resilient means carried by said socket member projecting into said opening and adapted to enter said notches and engage said right angular wall to prevent a relative axial movement of said members in one direction, said resilient means being slidable in said notches along the inclined wall thereof to permit a relative axial movement of said members in the opposite direction.

17. An article of manufacture having a head and a shank portion, the latter having a plurality of notches arranged in staggered relation about its surface, each notch having an abutting wall on the far side from said head, and a fastening element having an opening to receive said shank and provided with a yielding member for releasably engaging said notches whereby said element may be removed from said shank only by a combined relative rotating and axial movement.

18. A stud having notches therein shouldered to form an abutment toward one end of the stud and inclined to the surface of said stud toward the opposite end, said notches being arranged in longitudinal rows with the notches in one row intermediate the notches in the next row.

19. A stud having notches therein shouldered to form an abutment toward one end of the stud and inclined to the surface of said stud toward the opposite end, said notches being arranged in longitudinal rows with the notches in one row intermediate the notches in the next row, said notches in adjacent rows overlapping whereby there is no uncut surface on said stud for the full longitudinal length thereof.

20. A device of the character described comprising a stud circular in cross section and having a plurality of notches therein arranged in staggered overlapping relation, a socket member having an opening to receive said stud, and a plate having integral resilient arms carried by said socket member, said arms engaging said notches to lock said members in engagement.

In testimony whereof I affix my signature.

FREDERICK A. BALLOU, Jr.